(12) United States Patent
Thubert et al.

(10) Patent No.: US 7,986,643 B2
(45) Date of Patent: Jul. 26, 2011

(54) DETERMINING AND DISTRIBUTING ROUTING PATHS FOR NODES IN A NETWORK

(75) Inventors: Pascal Thubert, La Colle sur Loup (FR); Eric Levy-Abegnoli, Valbonne (FR); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 85 days.

(21) Appl. No.: 12/164,179

(22) Filed: Jun. 30, 2008

(65) Prior Publication Data
US 2009/0323709 A1    Dec. 31, 2009

(51) Int. Cl.
*H04L 12/28* (2006.01)
(52) U.S. Cl. .................. 370/256; 370/351; 370/408
(58) Field of Classification Search .................. 370/256, 370/351, 408
See application file for complete search history.

(56) References Cited

U.S. PATENT DOCUMENTS
2003/0179742 A1* 9/2003 Ogier et al. .................. 370/351

OTHER PUBLICATIONS

Farrel et al., "A Path Computation Element (PCE)-Based Architecture," RFC 4655, The Internet Society, Aug. 2006, 40 pages.
Ash & Le Roux, "Path Computation Element (PCE) Communication Protocol Generic Requirements," RFC 4657, The Internet Society, Sep. 2006, 21 pages.
Le Roux, Ed., "Requirements for Path Computation Element (PCE) Discovery," RFC 4674, The Internet Society, Oct. 2006, 19 pages.
Techincal Overview of Time Synchronized Mesh Protocol (TSMP), Dust Networks, Jun. 2006, 18 pages.

* cited by examiner

*Primary Examiner* — Seema S Rao
*Assistant Examiner* — Wanda Z Russell
(74) *Attorney, Agent, or Firm* — The Law Office of Kirk D. Williams

(57) ABSTRACT

Disclosed are, inter alia, methods, apparatus, computer-storage media, mechanisms, and means associated with determining and distributing routing paths for nodes in a network. For each route computational node of multiple route computational nodes in a network: a tree of paths between itself and each of multiple nodes in the network is determined. A particular tree of paths is determined for a particular node of these multiple nodes to the other nodes based on at least two of the determined trees of paths for the route computational nodes. The particular node then sends a packet towards a destination based on the particular tree of paths determined for the particular node.

18 Claims, 13 Drawing Sheets

NETWORK LAYOUT

CALCULATED SPF FOR CN-1

CALCULATED SPF FOR CN-2

CALCULATED SPF FOR CN-3

```
501 →    /* N is the set of all nodes itself                                    */
         /* A is the set of all know adjacencies                                */
         /* (N and A are not modified by the process)                           */ initialize for each route computational node:
             K(route computational node) to contain the route computational node
             C(route computational node) to contain the edges (the node(s) to which the route
                 computational node can directly communicate) pointing to an adjacency
                 in A(route computational node) and ordered from least to highest cost
         initialize for each node for which its tree of paths is being determined:
502 →        P(node) to empty select a number of route computational nodes from which to determine the tree(s) of paths
503 →        for the node(s)

for each selected route computational node:
504 →        while K(route computational node) != N
505 →            select the least cost edge in C(route computational node)
                     (since it is an ordered set, this is the first edge)
                 remove it from C(route computational node)
506 →            if the final node of the pointed to adjacency is not in K(route computational node)
                     add that final node to K(route computational node)
                     Clone the path from the route computational node to the previous node of the adjacency
                         and add to P(route computational node) with a destination of the final node and
                         a cost of the cloned path plus the cost from the adjacency
                     Allocate a pathlink in P(previous node) and chain it at the end of the cloned path
                     The pathlink is initialized by pointing to the adjacency pointed to by the
                         edge structure, with no next pathlink and cost of 0.
                     Walk through the cloned path that is now terminated by the new pathlink
                     Set the destination of the pathlink to the final node of the adjacency
                     Increment the cost of the pathlink by that of the adjacency from the edge structure
                     for each adjacency in A(route computational node) from the destination
507 →                    if the final node of the adjacency is not in K(route computational node)
                             allocate an edge structure pointing to the cloned path and to the adjacency
                             add the new edge structure to C(route computational node)
                         end if
                     end for
                 end if
             end while
         end for
```

FIGURE 5A

AFTER FIRST LOOP OF PROCESS

AFTER SECOND
LOOP OF PROCESS

AFTER THIRD
LOOP OF PROCESS

DETERMINING AND DISTRIBUTING ROUTING PATHS FOR NODES IN A NETWORK

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. In order to efficiently send packets through a network, devices typically need routing information describing how to send and/or forward packets to a next device based on the destination of a packet.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 5A illustrates a process performed in one embodiment;

DESCRIPTION OF EXAMPLE EMBODIMENTS

1. Overview

Figure 1:
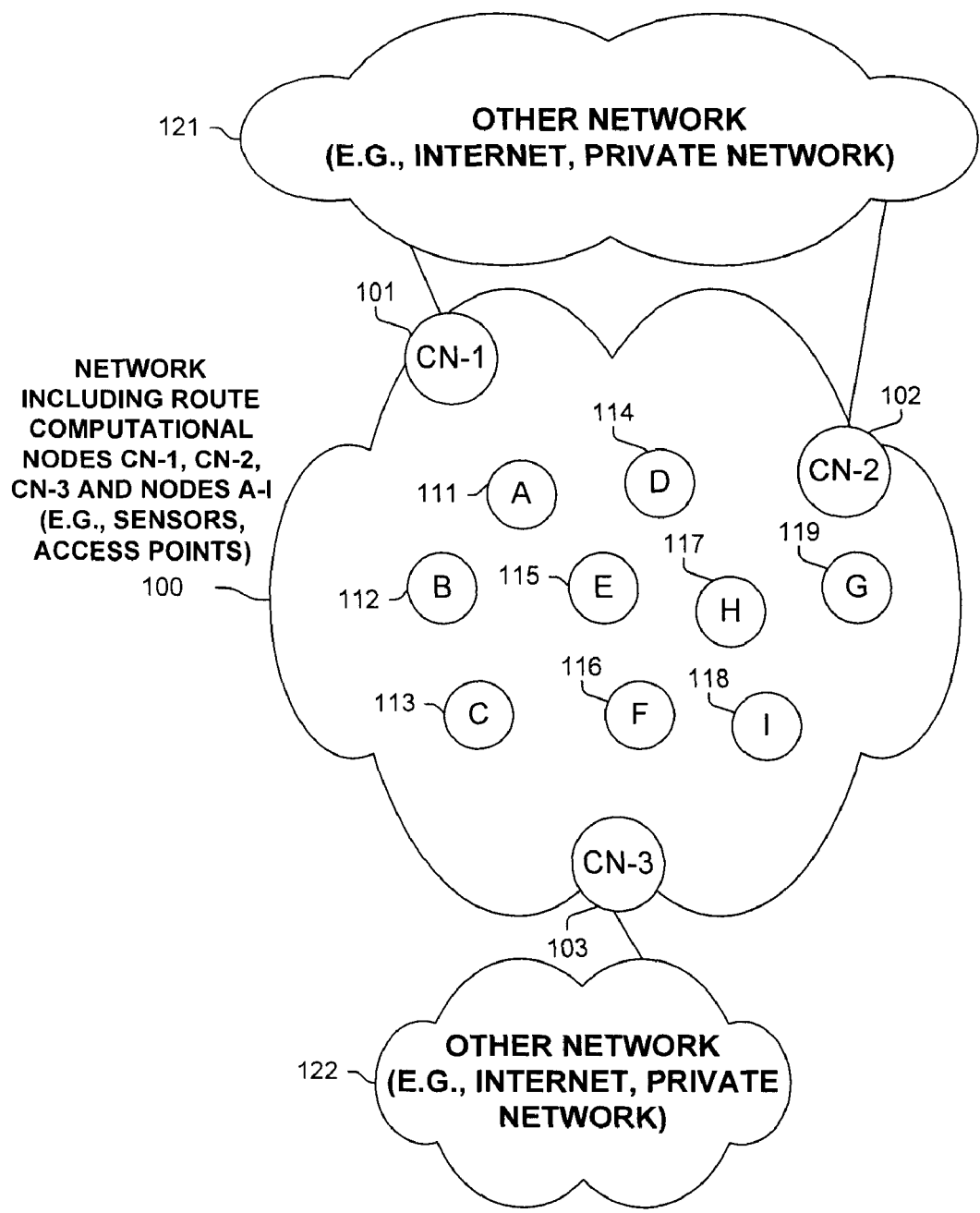
FIG. 1 illustrates an example network operating according to one embodiment.

Disclosed are, inter alia, methods, apparatus, computer-storage media, mechanisms, and means associated with determining and distributing routing paths for nodes in a network. One embodiment determines for each route computational node of multiple route computational nodes in a network: a tree of paths between itself and each of multiple nodes in the network. A particular tree of paths is determined for a particular node of these multiple nodes to the other nodes based on at least two of the determined trees of paths for the route computational nodes. The particular node then sends a packet towards a destination based on the particular tree of paths determined for the particular node.

2. Description

Disclosed are, inter alia, methods, apparatus, computer-storage media, mechanisms, and means associated with determining and distributing routing paths for nodes in a network. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Note, nothing described or referenced in this document is admitted as prior art to this application unless explicitly so stated.

Disclosed are, inter alia, methods, apparatus, computer-storage media, mechanisms, and means associated with determining and distributing routing paths for nodes in a network. Certain networks includes nodes that are limited in computational capability and/or may have a limited power source, such as wireless access points or sensors. For example, consider a mesh network of battery-operated, wireless sensors, such as for monitoring and/or controlling devices. It may be desirable to conserve there battery power or keep their costs down by providing less hardware and/or software functionality. Therefore, one embodiment derives the routing information for other nodes, and then communicates this routing information to these nodes to reduce the resources required by these nodes to determine its own routing information. In one embodiment, the routing information for these other nodes is derived from manipulation of one or more trees of paths computed for one or more route computational nodes (e.g., rather than performing a shortest-path first computation for each node).

One embodiment performs operations, including: determining, for each route computational node of a plurality of route computational nodes in a network, a tree of paths between itself and each of a plurality of nodes in the network; determining a particular tree of paths for a particular node of the plurality of nodes to a plurality of the plurality of nodes based on at least two of said determined trees of paths for said route computational nodes; and the particular node sending a packet towards a destination based on the particular tree of paths.

One embodiment performs operations, including: populating one or more routing data structures stored in one or more computer-readable media based on the particular tree of paths; and the particular node determining a next path over which to send the packet based on one or more lookup operations on said routing data structures. In one embodiment, each of said route computational nodes determines its own said tree of paths between itself and each of the plurality of nodes in the network. In one embodiment, a particular route computational node of said route computational nodes receives at least one of said at least two of said determined trees of paths for said route computational nodes from one or more of the plurality of route computational nodes, and performs said determination of the particular tree based on said at least two of said determined trees of paths for said route computational nodes. In one embodiment, the particular node receives the particular tree of paths from the particular route computational node. In one embodiment, the particular node receives the particular tree of paths from the particular route computational node through one or more nodes of the plurality of nodes to reach the particular node.

In one embodiment, said determination of the particular tree of paths includes splicing subtrees of paths from said at least two of said determined trees of paths for said route computational nodes. In one embodiment, at least two of said spliced subtrees includes at least three nodes each. In one embodiment, the particular tree of paths includes paths to at least two of the plurality of route computational nodes. In one embodiment, each of the plurality of nodes is a sensor in radio-based communication with at least one of the plurality of nodes or the plurality of route computational nodes. In one embodiment, each of the plurality of nodes is in communication with at least one of the plurality of nodes or the plurality of route computational nodes via radio-based communication. In one embodiment, each of the plurality of route computational nodes is a gateway node to one or more other networks. In one embodiment, said each route computational node of the plurality of route computational nodes said determines the tree of paths from itself through the network to each of a plurality of nodes based on a shortest path first computation on network connectivity information describing the network. One embodiment performs operations, including: determining a tree of paths for each other node in addition to the particular node of the plurality of nodes to a plurality of the plurality of nodes based on at least two of said determined trees of paths for said route computational nodes; and populating routing one or more routing data structures stored in one or more computer-readable media in each of said other nodes with its respective said determined tree of paths. In one embodiment, said determining the trees of paths for said other nodes is performed by one or more of the plurality of route computational nodes.

On embodiment includes one or more processors and memory, wherein the memory stores one or more instructions that, when executed by said one or more processors, perform operations comprising: determining a tree of paths between the apparatus and each of a plurality of nodes in a network; determining a particular tree of paths for a particular node of the plurality of nodes to a plurality of the plurality of nodes based on said determined tree of paths and one or more received trees of paths from one or more other nodes of the plurality of nodes, wherein said determining the particular tree of paths includes splicing subtrees from each of at least two trees of paths from a group including the particular tree of paths and said received trees of paths; sending the particular tree of paths to the particular node for use in determining where to send packet in the network; and populating, based on said determined tree of paths between the apparatus and each of the plurality of nodes in a network one or more routing data structures stored in one or more computer-readable media for use in sending packets in the network. In one embodiment, each of at least two said spliced subtrees includes at least three nodes. One embodiment includes a wireless communications interface configured for communication with one or more of the plurality of nodes.

One embodiment performs operations, including: determining, for a route computational node a network, a tree of paths between itself and each of a plurality of nodes in the network; determining a particular tree of paths for a particular node of the plurality of nodes to a plurality of the plurality of nodes based on said determined trees of paths for the route computational node; and the particular node sending a packet towards a destination based on the particular tree of paths. One embodiment performs operations, including: populating one or more routing data structures stored in one or more computer-readable media based on the particular tree of paths; and the particular node determining a next path over which to send the packet based on one or more lookup operations on said routing data structures.

One embodiment includes: means for determining a tree of paths between the apparatus and each of a plurality of nodes in a network; means for determining a particular tree of paths for a particular node of the plurality of nodes to a plurality of the plurality of nodes based on said determined tree of paths and one or more received trees of paths from one or more other nodes of the plurality of nodes, wherein said determining the particular tree of paths includes splicing subtrees from each of at least two trees of paths from a group including the particular tree of paths and said received trees of paths; means for communicating the particular tree of paths to the particular node for use in determining where to send packet in the network; and means for sending packets in the network based on said determined tree of paths between the apparatus and each of the plurality of nodes in a network. In one embodiment, each of at least two said spliced subtrees includes at least three nodes.

Turning to the figures, FIG. 1 illustrates an example network 100, which includes nodes 101-119, with access to two other networks 121, 122 (e.g., the Internet, public and/or private networks) via nodes 101-103. In one embodiment, nodes 111-119 correspond to wireless sensors or access points. In one embodiment, nodes 101-103 are "computational nodes" (CNs) 101-103 as they are configured to determine routing information for nodes 111-119. In one embodiment, CNs 101-103 are controllers for nodes 111-119. In one embodiment, some of nodes 101-119 communicate with other nodes using wireless technology. In one embodiment, some of nodes 101-119 communicate with other nodes using wired technology. In one embodiment, one or more of computational nodes provide access to another network.

In one embodiment, nodes 111-119 run a protocol, such as, but not limited to, Adaptive Wireless Path Protocol (AWPP) or Lightweight Access Point Protocol (LWAPP) to join their respective controller/computation node 101-103, which provides for the discovery of the connectively topology of network 100.

Figure 2:
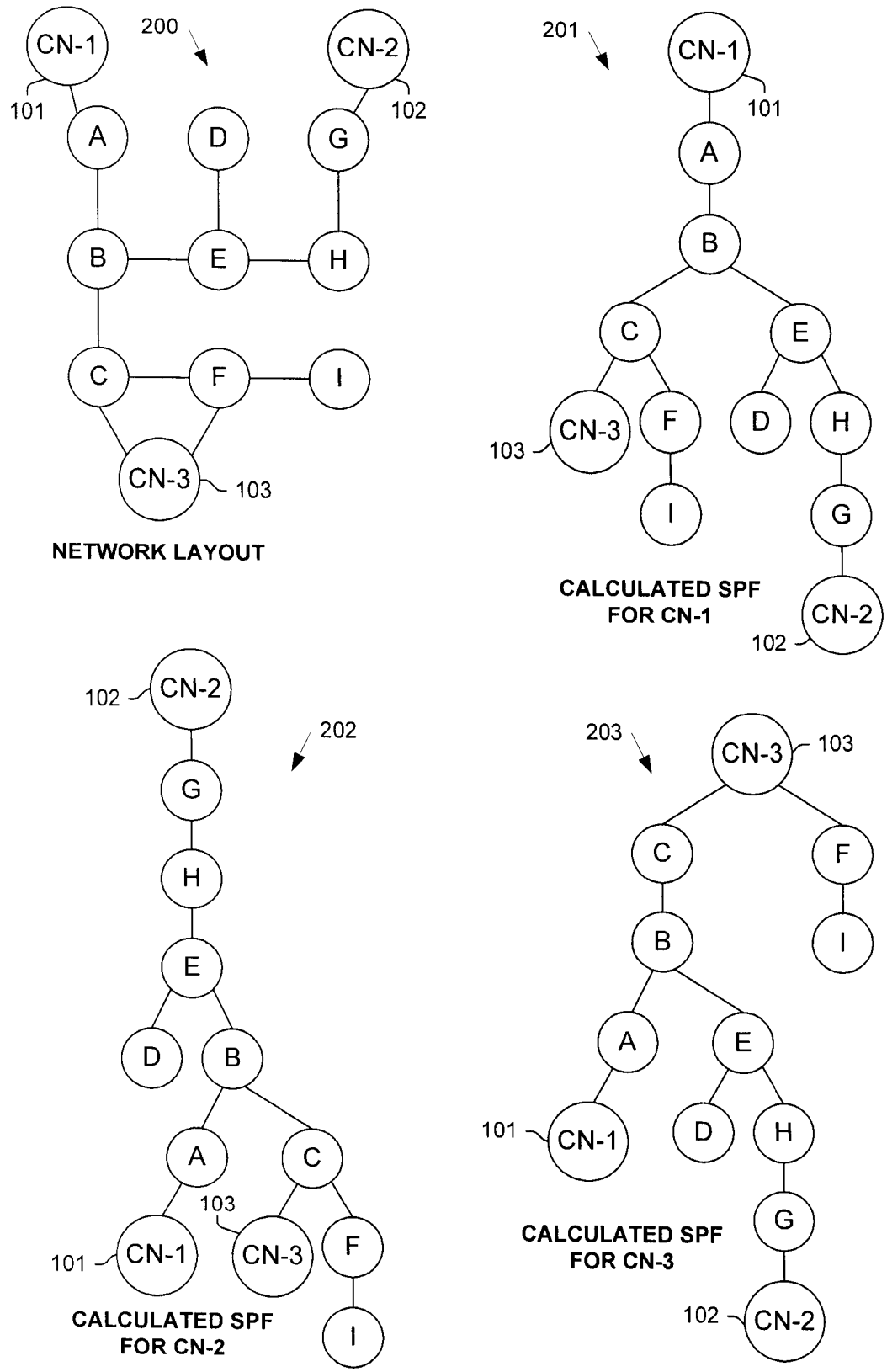
FIG. 2 illustrates a calculation of a tree of paths performed according to one embodiment for the example network.

One possible determined connectivity is shown as network layout 200 in FIG. 2, which includes nodes 101-119 illustrated in FIG. 1. A tree of paths (201-203) to each of nodes 101-119 is computed for each of computational nodes 101-103. In one embodiment, each of computational nodes 101-103 compute their own tree of paths 201-203 to the other nodes, and communicate their resultant tree of paths to one or more other computational nodes. In one embodiment, the tree of paths are determined using shortest path first (SPF). In one embodiment, a computational node determines the tree of paths for the other nodes based on at least two trees of paths computed for computational nodes. In one embodiment, multiple computational nodes determine the tree of paths for the other nodes (e.g., the work is partitioned among the computational nodes, such as by distance or another partitioning method) typically based on at least two trees of paths computed for computational nodes.

Figure 3A:
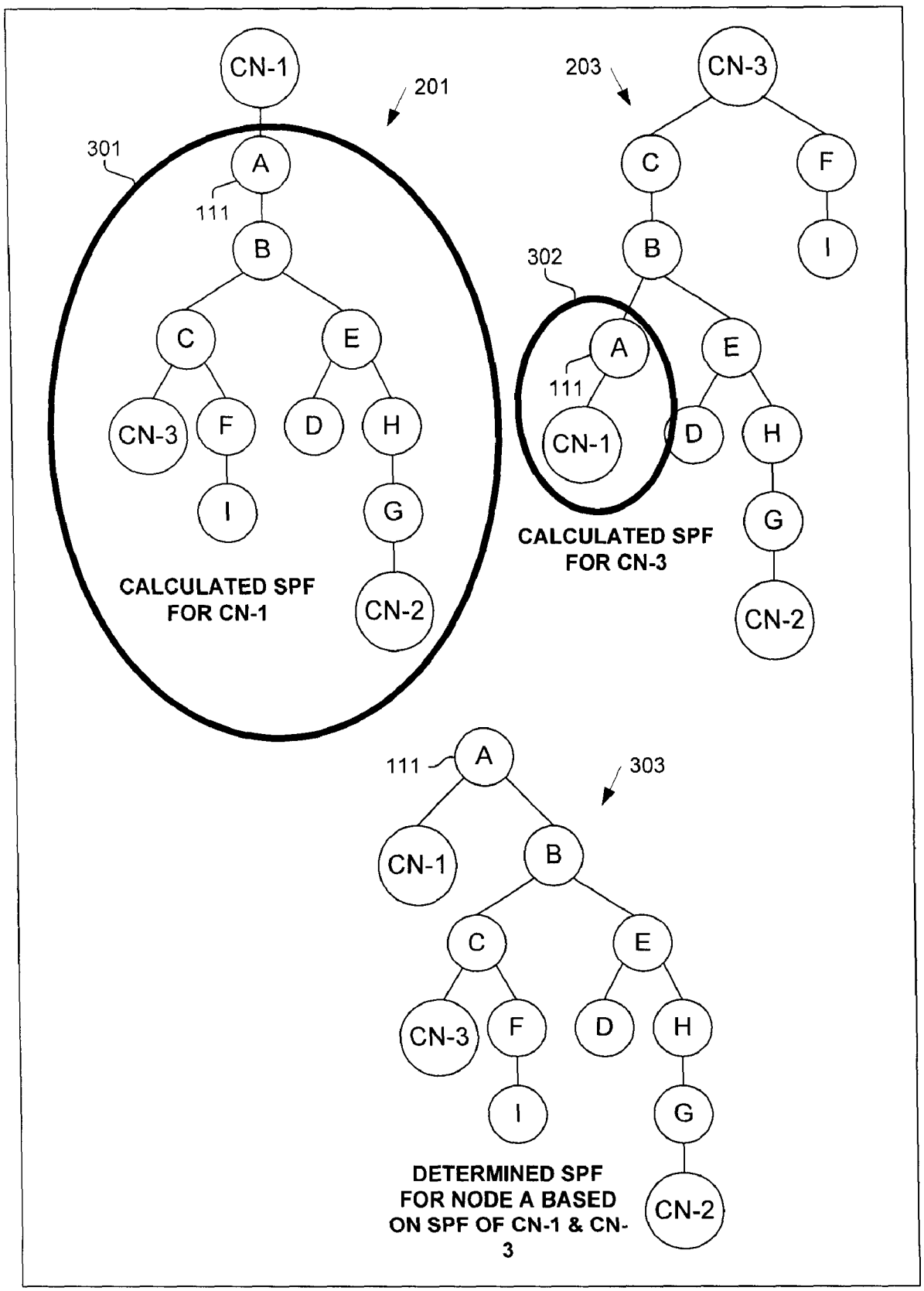
FIG. 3A-3C illustrate the determination of path of trees for certain nodes in the example network based on previously calculated tree of paths for other nodes, which includes splicing some subtrees of these tree of paths.
Figure 3B:
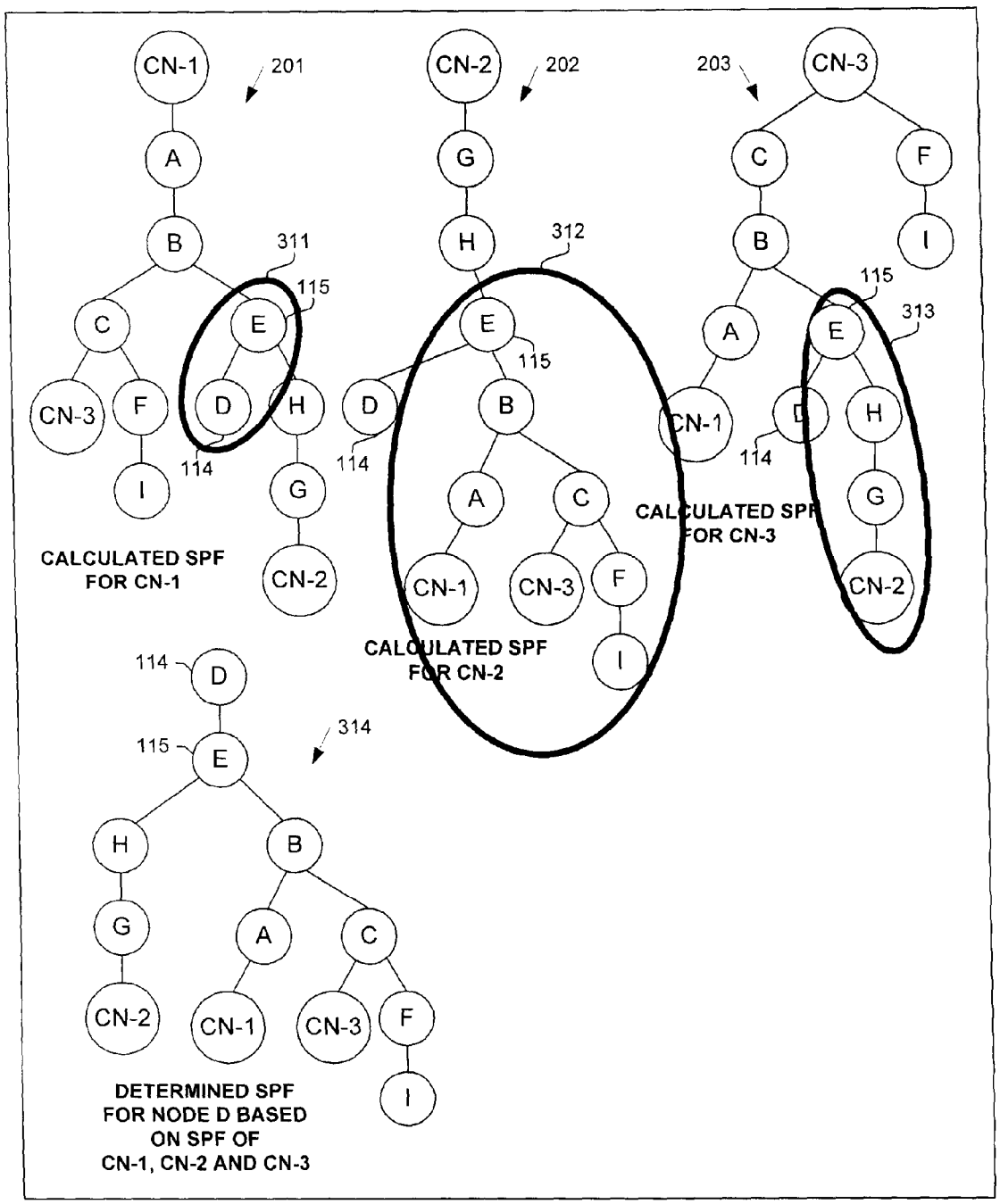
Figure 3C:
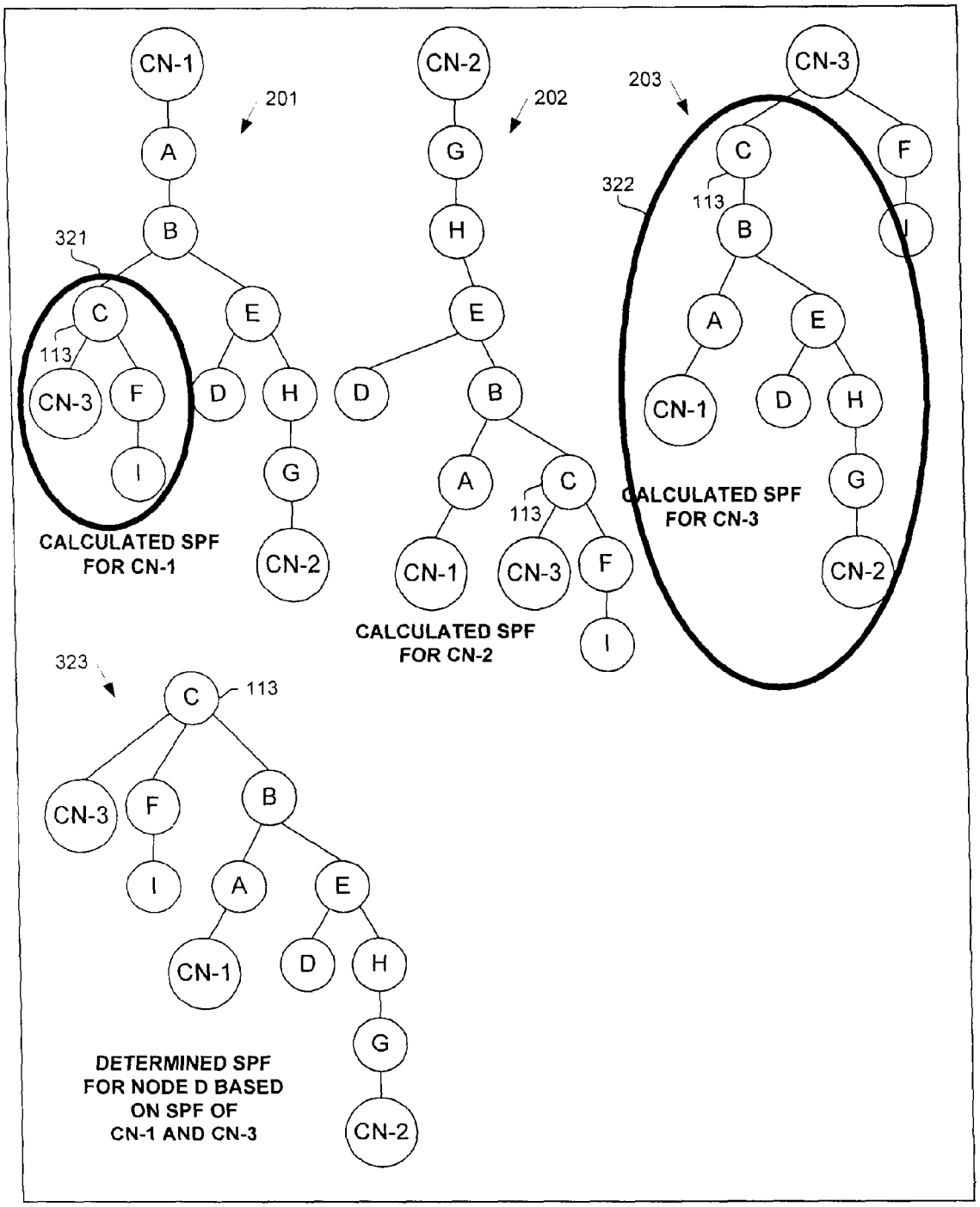

FIGS. 3A-C illustrate the determination of tree of paths for three different nodes, which includes splicing subtrees from multiple trees of paths determined for the computational nodes, as the paths from a node in a tree of paths to its children nodes (comprising the subtree) are the shortest paths from the node to these children nodes. Therefore, the tree of paths for a node may be determined based on splicing subtrees from computed trees of paths, without having to perform the shortest path first calculation for the node.

FIG. 3A illustrates the determination of the tree of paths 303 based on tree of paths 201 (for CN-1) and tree of paths 203 (for CN-3), which includes splicing subtrees 301 and 302. When a node is directly connected to a computational node, a large subtree of nodes 301 is available for splicing with a subtree 302 from another tree of paths that has the computational node as a child of the node (e.g., node 111 in this example). Therefore, tree of paths 303 for node A 111 is determined by splicing subtrees 301 and 302.

FIG. 3B illustrates the determination of the tree of paths 314 based on tree of paths 201 (for CN-1), tree of paths 202 (for CN-2), and tree of paths 203 (for CN-3), which includes splicing subtrees 312 and 313. In this example, from FIG. 2, network layout 200 illustrates that node D 114 is not directly communicatively connected to any computation node (101, 102, 103). Therefore, there will be no tree of paths where D 114 will have a child node. Therefore, subtree 311 is used (e.g., flipped and spliced) to find node E 115 which does have child nodes in one or more of tree of paths 201, 202, 203, and then subtrees 312 and 313 can be directly spliced based on node E 115 to generated tree of paths 314 for node D 114.

FIG. 3C illustrates the determination of the tree of paths 323 based on tree of paths 201 (for CN-1) and tree of paths 203 (for CN-3), which includes splicing subtrees 321 and 322 to generated tree of paths 323 for node C 113.

Figure 4:
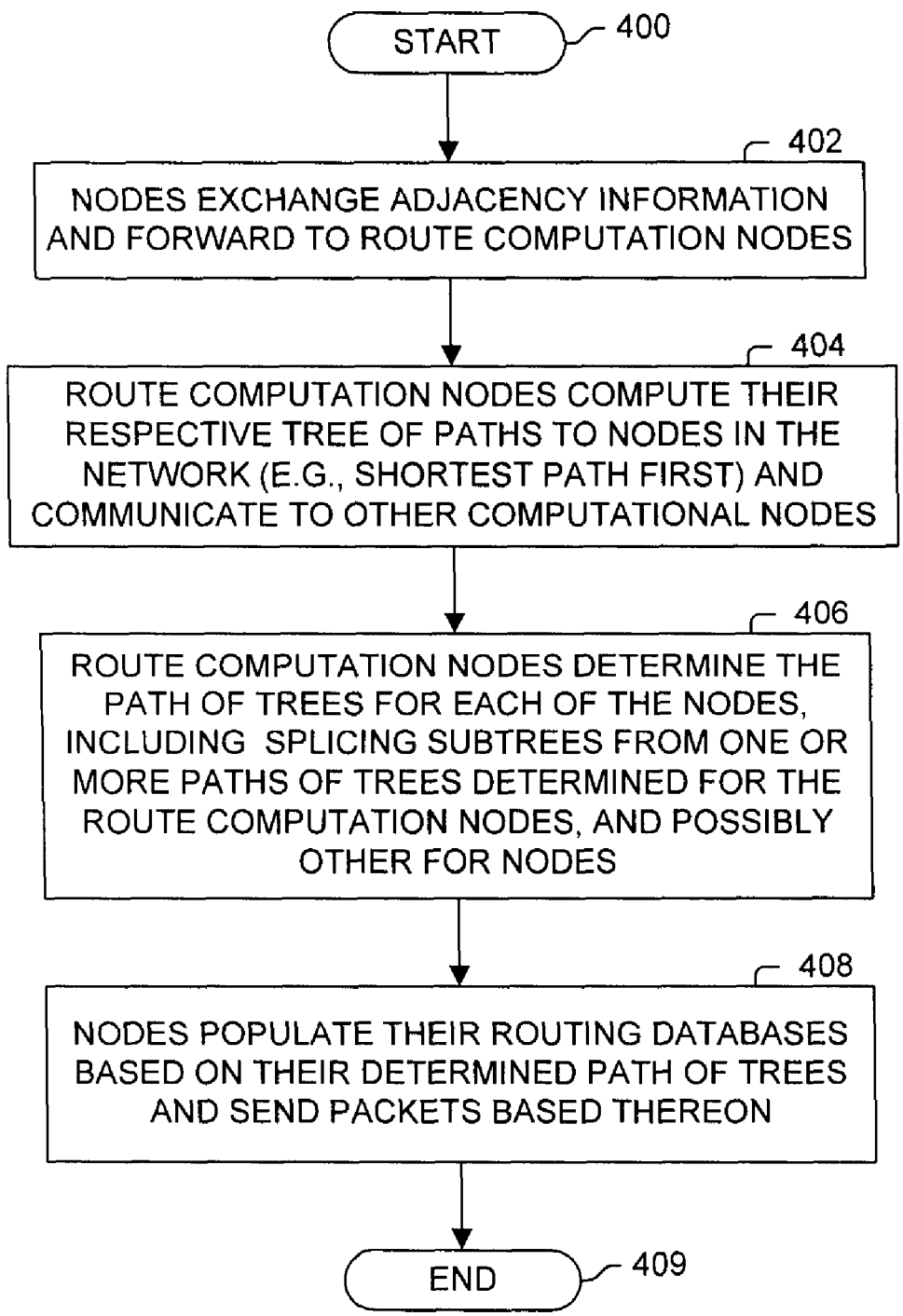
FIG. 4 illustrates a process performed in one embodiment.

FIG. 4. presents a flow diagram illustrating a process used in one embodiment for determining the trees of paths for nodes. Processing begins with process block 400. In process block 402, nodes exchange adjacency information and forward to route computational nodes, such as using Adaptive Wireless Path Protocol (AWPP) or Lightweight Access Point Protocol (LWAPP) and a link state protocol to communicate the information to its neighboring nodes. In process block 404, the route computational nodes compute their respective tree of paths to the other nodes in the network, such as, but not limited to using shortest path first (SPF), and communicate their tree of paths to other computational nodes. In process block 406, the route computation nodes collectively determine the path of trees for the other nodes, which typically includes splicing subtrees from the trees of paths for multiple computational nodes and possibly from other nodes (e.g., already determined trees of paths from non-computational nodes). In process block 408, the routing databases in the nodes are populated, typically with next hop information, based on their respective computed tree of nodes for use in sending/routing/forwarding packets based thereon. A default route is typically also populated in the routing databases to which to forward packets which do not match another entry. For example, a packet may traverse a portion of the network based on the default route(s) of one or more nodes, and then be forwarded by a particular node based on a tree of paths derived from the tree of paths of one or more route computational nodes. The processing of the flow diagram of FIG. 4 is complete as indicated by process block 409.

FIG. 5A illustrates a process 500 used in one embodiment to determining the trees of paths for nodes based on determined tree of paths for one or more route computational nodes. This process may provide an efficiency by determining the tree of paths for all of the nodes simultaneously.

Figure 5B:
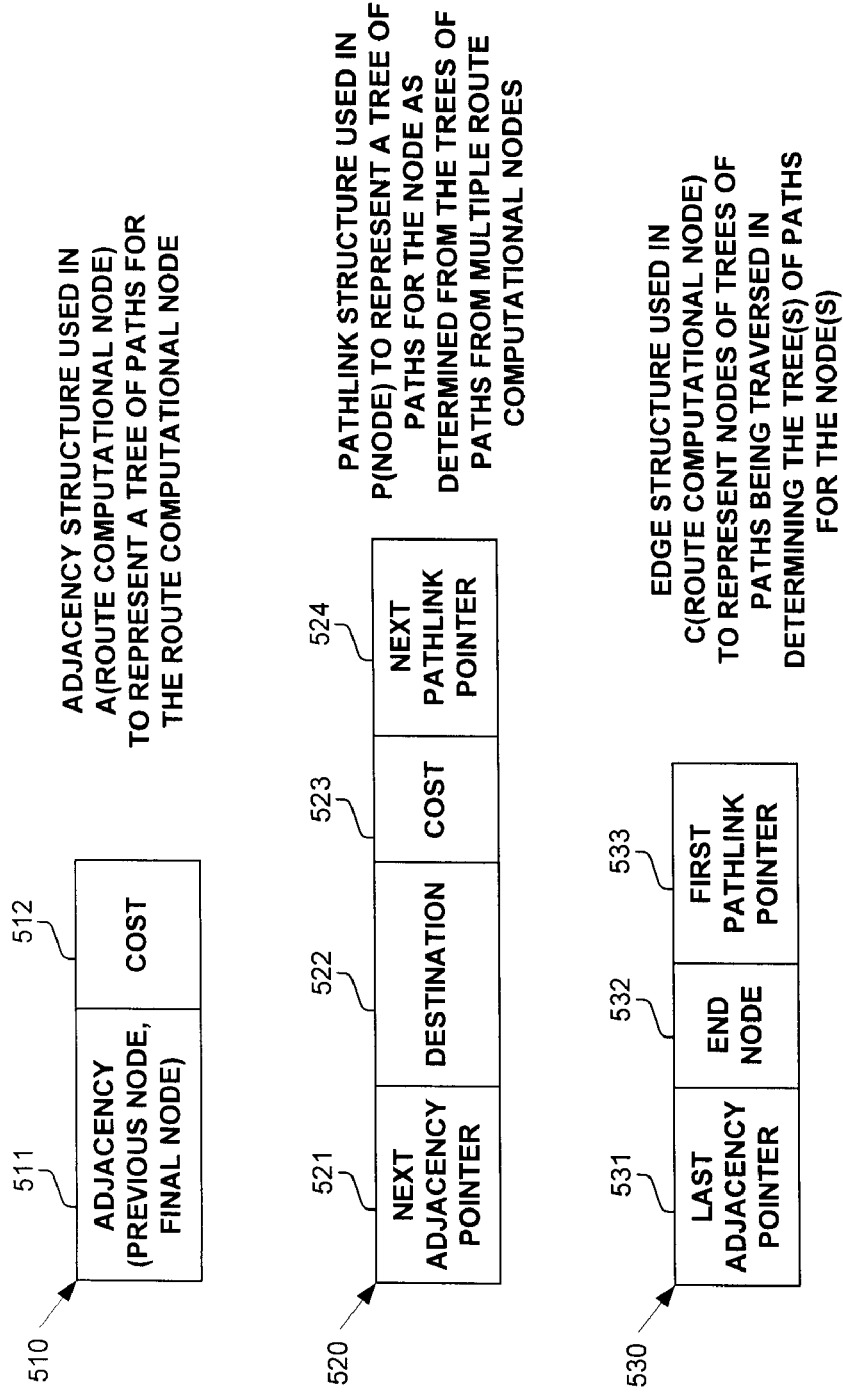
FIG. 5B illustrates a few data structures used in one embodiment.

The tree of paths for a route computational node is represented by an adjacency set A(route computational node). FIG. 5B illustrates an adjacency structure 510, used in one embodiment, which includes the adjacency 511 going from an identified "previous node" to an identified "final node" and its corresponding cost 512. Therefore, in one embodiment, A(route computational node) includes a plurality of adjacency structures 510 representing the tree of paths for the route computational node.

The process of FIG. 5A first performs some initialization (501). K(route computational node) is a temporary storage including a set or list of nodes already considered, which is initialized for each route computational node to be the route computational node itself. Additionally, an edge data structure C(route computational node) is used in determining the trees of paths for the nodes. The edge data structure is a temporary storage used to traverse a tree of paths for a route computational node by adding in nodes which can communicate with a node that is being processed by the process illustrated in FIG. 5A. One embodiment uses an edge structure 530 (FIG. 5B), which includes a last adjacency pointer 531 used to point into the adjacency set A(route computational node), an end node 532 (an identifier of the node not previously considered [i.e., not in K(route computational node) by the process but directly communicates with a node already considered—i.e., is in K(route computational node)];

and a first pathlink pointer 533 used to point to a pathlink in a pathlink structure P(node). C(route computational node) is an ordered set or list that is ordered based on costs, from low to high (as this process first traverses lower cost paths by checking the adjacencies in this order).

Finally, the data structure P(node) is initialized to empty for each route computational node and for each node for which a tree of paths is being determined. At the conclusion of this process, P(node) will contain a tree of paths for the node. In one embodiment, P(node) will contain a set of pathlink structures 520 to represent the tree of paths for the node. As shown in FIG. 5B, pathlink structure 520 includes a next adjacency pointer 521 used to point into A(route computational node); destination 522 (an identifier of the node it represents on the tree of paths); cost 523 to reach this represented node from the node; and a next pathlink pointer 524 used to chain pathlink structures 520.

Next, a set of route computational nodes is selected (502) for use of their previously determined tree of paths in determining the tree of paths for the other nodes. Then, for each of these selected route computational nodes (503): the determined tree of paths for the selected route computational node (represented by adjacency set A(route computational node) is processed as described hereinafter (marked by labels 504-507). While all nodes have not been processed for the route computational node (504), the least cost edge in C(route computational node) is selected and removed (505). If the final node of the pointed to adjacency in not in K(route computational node) as it has not been processed (506), then the final node is added to K(route computational node) to indicate that it has been processed. The path from the route computational node to the previous node of the adjacency is cloned (e.g., copied, spliced) and added to P(route computational node) with a destination of the final node and a cost of the cloned path plus the cost from the adjacency. A pathlink structure is allocated in P(previous node), with it being chained at the end of the cloned path. This pathlink structure is initialized by pointing to the adjacency pointed to by the edge structure, with no next pathlink and a cost of zero. The cloned path, terminated by the new pathlink structure, is walked through to reach the new pathlink structure, with its destination being set to the final node of the adjacency, with the cost of the pathlink structure being incremented by that of the adjacency from the edge structure.

Next, as illustrated by reference 507, for each adjacency in A(route computational node) from the destination, if the final node of the adjacency has not been processed by this process illustrated in FIG. 5A [i.e., the final node is not in K(route computational node)], then it needs to be processed in order to possibly clone/copy/splice one or more paths from this node into a path of trees being determined for one of the nodes. To accomplish this, an edge structure pointing to the cloned path and to the adjacency is allocated and added to C(route computational node).

When this processing is complete, C(node) contains a tree of paths for each node.

A determined tree of paths for a particular node is communicated to the particular node, or is converted into routing table information which is then communicated to the particular node. The particular node typically populates a routing data structure with the routing information (e.g., which next hop to take for reaching a given node), as well as a default route for reaching other nodes. A packet is sent out a default route when the node does not know a specific path to reach the destination. Such a sent packet may reach one or more nodes via a default path programmed into these nodes(s) or eventually reach a node that knows specifically how to reach the destination (such as a node whose determined tree of paths includes the destination).

Figure 6A:
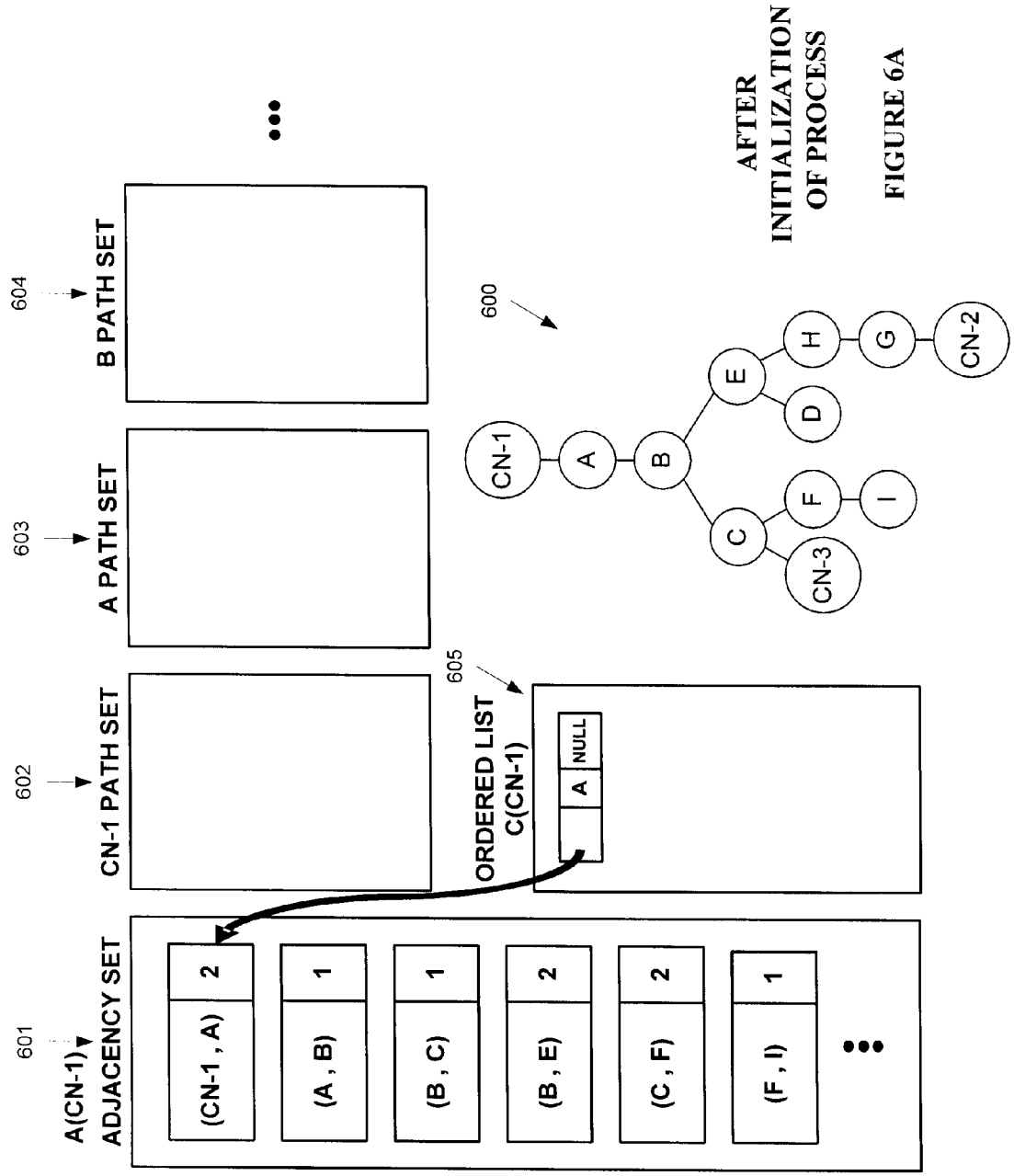
FIGS. 6A-D illustrate the operation of an embodiment operating in accordance with FIG. 5A on an example network.

FIGS. 6A-D illustrate the operation of an embodiment operating in accordance with FIG. 5A on an example network. FIG. 6A illustrates example network 600, which shows a tree of nodes computed for route computational node CN-1, and the corresponding adjacencies 601 including some example costs. As described in relation to FIG. 5A, one embodiment uses multiple data structures in its operations, including: adjacency set 601 and ordered list C 605, and a path set for each of the nodes including one or more route computational nodes. Hence, FIG. 6A illustrates CN-1 path set 602, A path set 603 (i.e., the path set representing the derived tree of paths for node A based on at least the tree of paths determined for CN-1 represented by adjacency set 601), and B path set 604 (i.e., the path set representing the derived tree of paths for node B based on at least the tree of paths determined for CN-1 represented by adjacency set 601). Note, the path sets for the other nodes are not illustrated in the presented example.

Figure 6B:
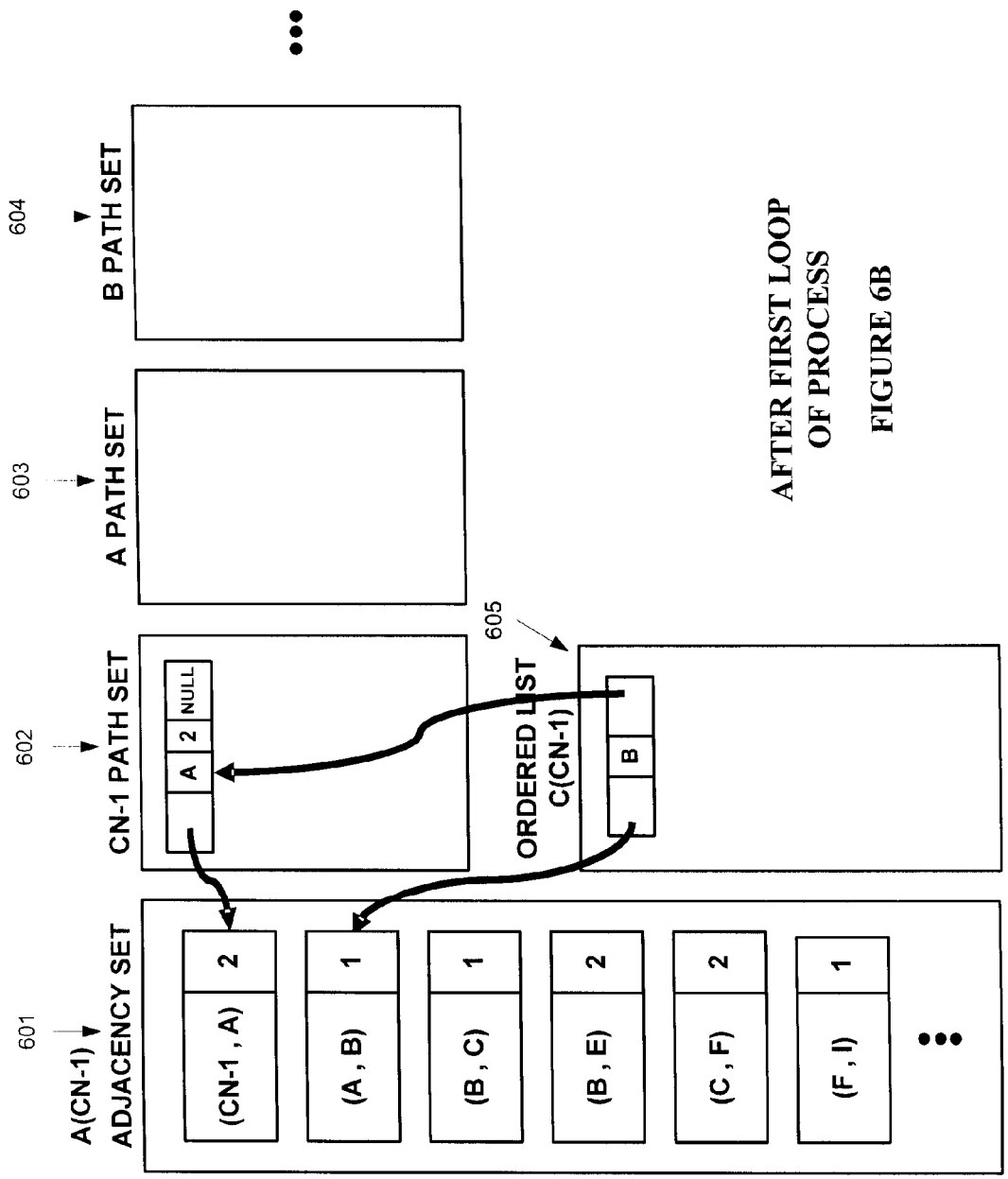
Figure 6C:
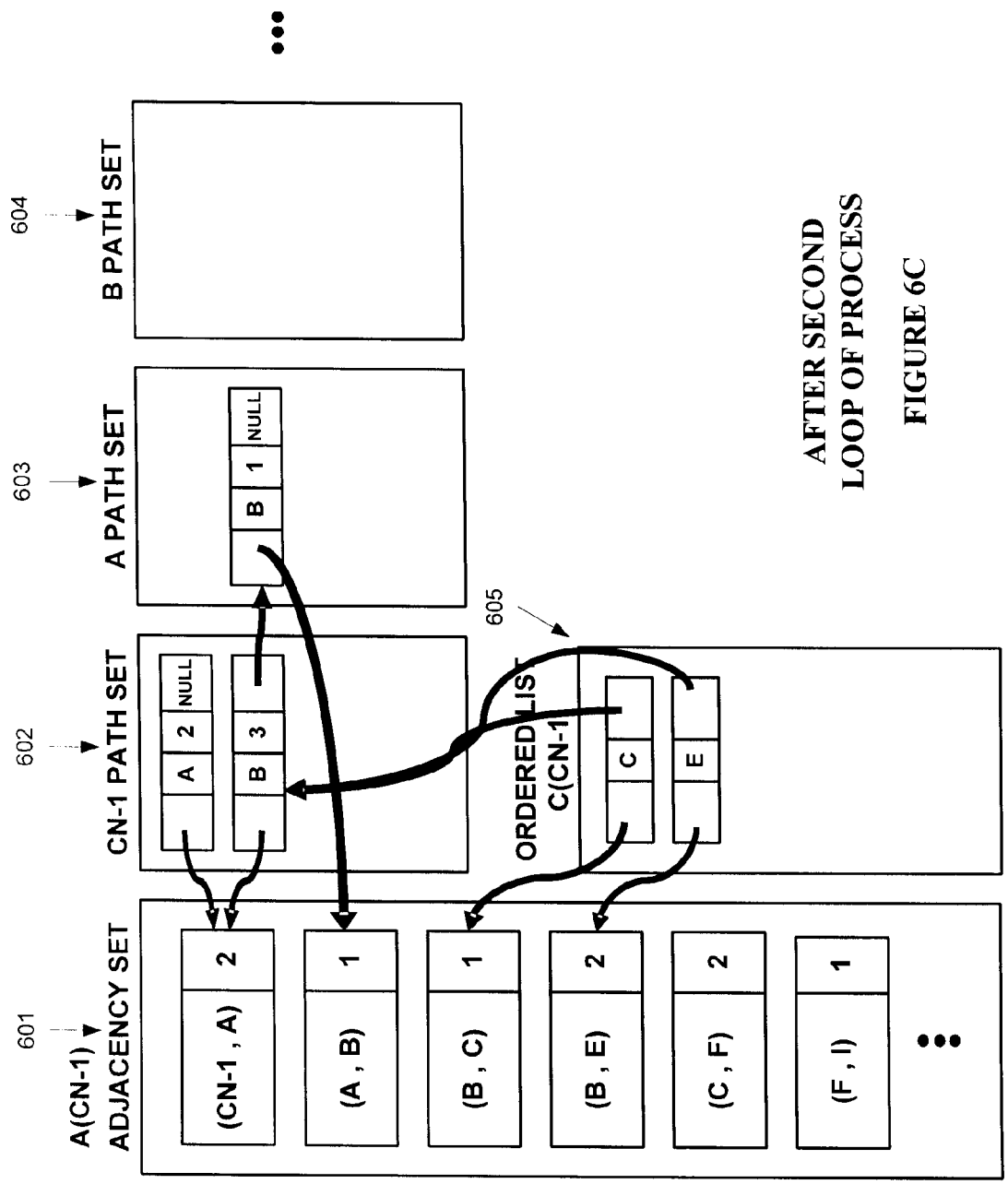
Figure 6D:
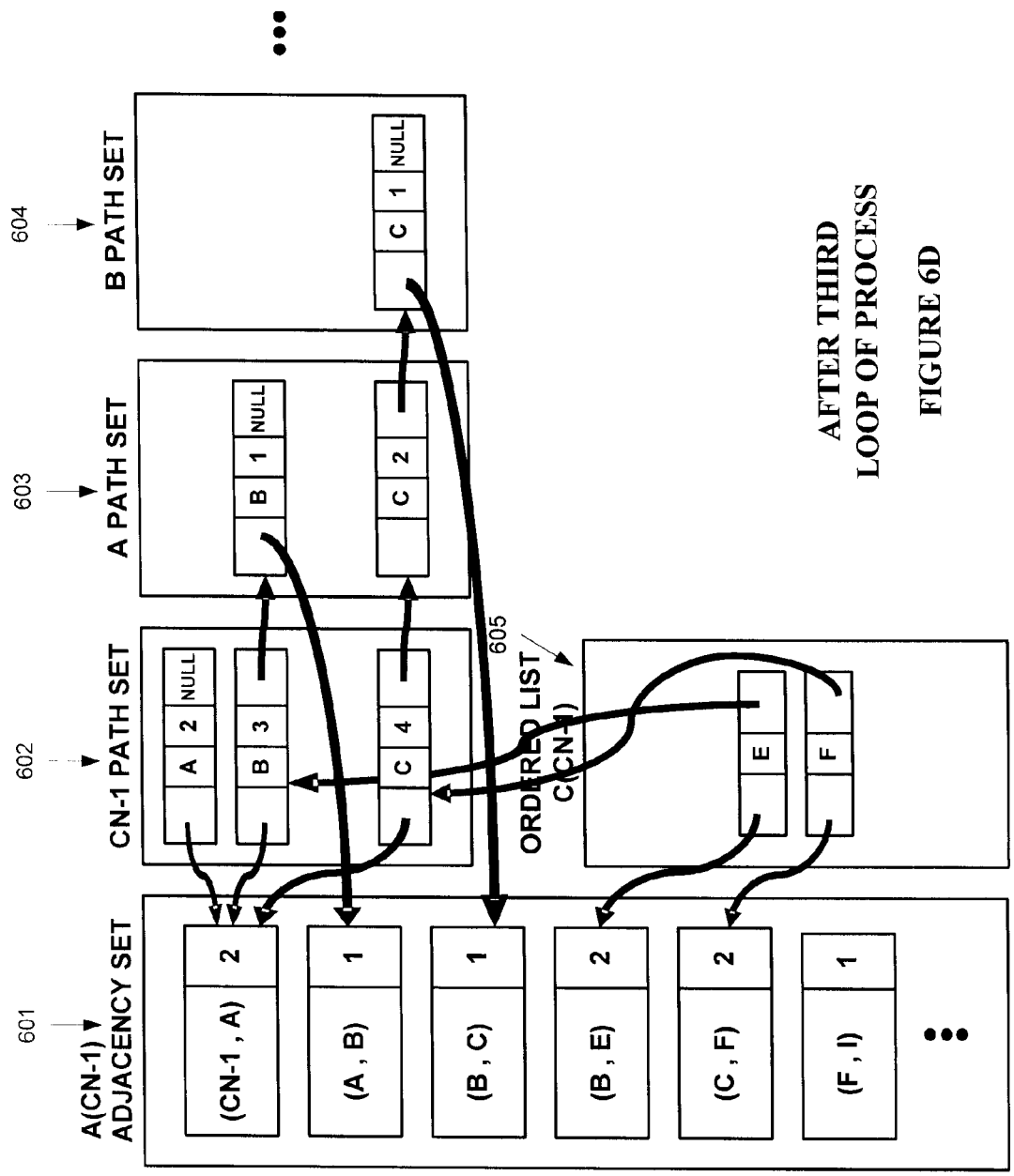

FIG. 6A illustrates data structures 601-605 after initialization (501 of FIG. 5A). Note, CN-1's adjacency set 601 [also referred to as A(CN-1)], is not modified in one embodiment. Of note, ordered list C(CN-1) 605 includes an entry for node A, and only node A, as the only edge of CN-1 is node A in this example as illustrated in depiction 600. FIGS. 6B, 6C and 6E illustrate the state of structures 601-605 after a first, second, and third pass through while loop 503 (FIG. 5A).

The edge (to node A) is selected (505, FIG. 5A) from C(CN-1) 605 and produces (506, FIG. 5A) the entry for A in CN-1 path set 602, and with an entry corresponding to its (i.e., A's) adjacency/edge of node B being added to C(CN-1) 605 by processing 507 (FIG. 5A). FIG. 6B illustrates the state of structures 601-605 after a first pass through while loop 503 (FIG. 5A).

Processing of the while loop 504 of FIG. 5A continues. Edge B is selected (505, FIG. 5A) from C(CN-1) 605 and produces (506, FIG. 5A) the entries for B in CN-1 path set 602 and A path set 603 (through the use of cloning/copying/splicing), and with entries corresponding to its (i.e., B's) adjacencies/edges of nodes C and E added to C(CN-1) 605 by processing 507 (FIG. 5A). FIG. 6C illustrates the state of structures 601-605 after a second pass through while loop 503 (FIG. 5A).

Processing of the while loop 504 of FIG. 5A continues. Edge C is selected (505, FIG. 5A) from C(CN-1) 605 and produces (506, FIG. 5A) the entries for C in CN-1 path set 602, A path set 603 and B path set 604 (through the use of cloning/copying/splicing), and with an entry corresponding to its (i.e., C's) adjacency/edge of node F added to C(CN-1) 605 by processing 507 (FIG. 5A). FIG. 6C illustrates the state of structures 601-605 after a second pass through while loop 503 (FIG. 5A).

This processing continues for each of one or more of the selected route computational nodes, which results in the tree of paths represented for node A in A path set 603, tree of paths represented for node B in B path set 604, etc.

Figure 7:
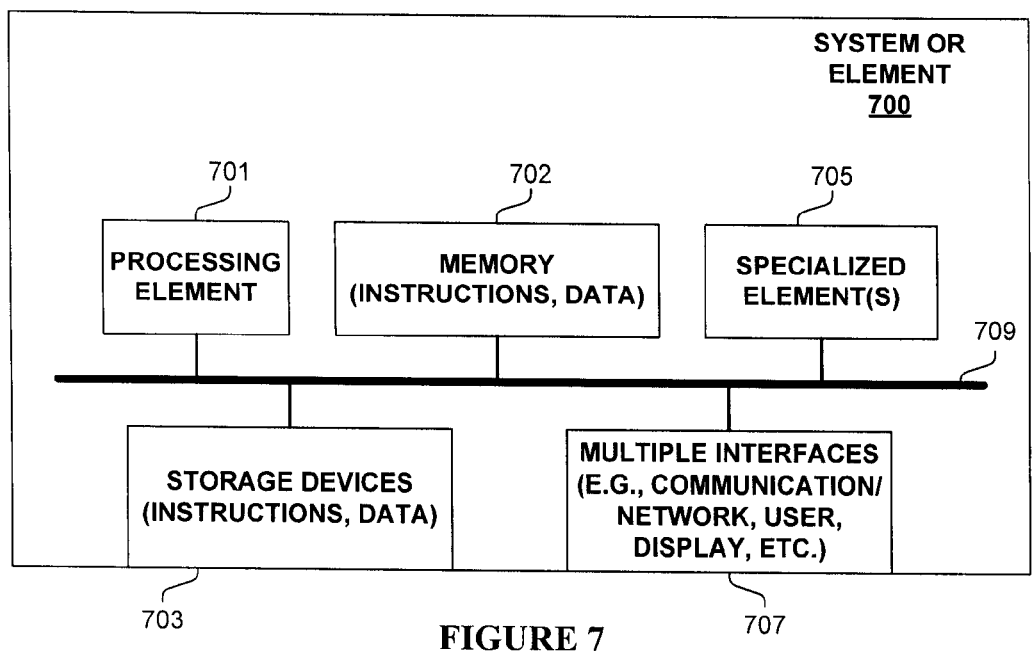
FIG. 7 illustrates an example system or component used in one embodiment.

FIG. 7 is block diagram of a system or component 700 used in one embodiment that determines and distributes routing paths for nodes in a network. In one embodiment, system or component 700 performs one or more processes corresponding to one of the flow diagrams illustrated or otherwise described herein.

In one embodiment, system or component 700 includes a processing element 701, memory 702, storage devices 703, specialized components 705 (e.g. optimized hardware such as for performing tree of path determinations or routing lookup operations based on routing information derived from tree of paths for a node, etc.), and interface(s) 707 for communicating information (e.g., sending and receiving packets, user-interfaces, displaying information, etc.), which are typically communicatively coupled via one or more communications mechanisms 709, with the communications paths typically tailored to meet the needs of the application.

Various embodiments of component 700 may include more or less elements. The operation of component 700 is typically controlled by processing element 701 using memory 702 and storage devices 703 to perform one or more tasks or processes. Memory 702 is one type of computer-readable/computer-storage medium, and typically comprises random access memory (RAM), read only memory (ROM), flash memory, integrated circuits, and/or other memory components. Memory 702 typically stores computer-executable instructions to be executed by processing element 701 and/or data which is manipulated by processing element 701 for implementing functionality in accordance with an embodiment. Storage devices 703 are another type of computer-readable medium, and typically comprise solid state storage media, disk drives, diskettes, networked services, tape drives, and other storage devices. Storage devices 703 typically store computer-executable instructions to be executed by processing element 701 and/or data which is manipulated by processing element 701 for implementing functionality in accordance with an embodiment.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
determining, by each route computational node of a plurality of route computational nodes in a network, a tree of paths specifying shortest path routing information from itself to each of a plurality of nodes in the network and to each of the other of the plurality of route computational nodes; wherein the network includes the plurality of nodes in addition to the plurality of route computational nodes;
determining, by a particular route computational node of the plurality of route computational nodes, on behalf of, and from the perspective of, a particular node of the plurality of nodes, a particular tree of paths specifying shortest path routing information from the particular node to a plurality of the plurality of nodes and to the plurality of route computational nodes based on at least two of said determined trees of paths for said route computational nodes for the particular node to use in routing packets based on the particular tree of paths without calculating the particular tree of paths; and
communicating, from the particular route computational node to the particular node, the particular tree of paths for the particular node to populate one or more routing data structures for said use in routing packets such that the particular node does not compute the particular tree of paths in order to populate said routing data structures.

2. The method of claim 1, including:
populating, by the particular node, one or more routing data structures stored in one or more computer-readable media based on the particular tree of paths;
the particular node determining a next path over which to send a packet based on one or more lookup operations on said routing data structures; and
forwarding, by the particular node, the packet according to said determined next path.

3. The method of claim 1, wherein each of said route computational nodes determines its own said tree of paths between itself and each of the plurality of nodes in the network.

4. The method of claim 3, wherein the particular route computational node receives at least one of said at least two of said determined trees of paths for said route computational nodes from one or more of the plurality of route computational nodes other than the particular route computational node.

5. The method of claim 1, wherein the particular node receives the particular tree of paths from the particular route computational node through one or more nodes of the plurality of nodes to reach the particular node.

6. The method of claim 1, wherein said determination of the particular tree of paths includes splicing subtrees of paths from said at least two of said determined trees of paths for said route computational nodes; wherein splicing of a first and second subtrees to form a tree of paths is defined as attaching the first and second subtrees using an identified node, common to both the first and second subtrees, such that said formed tree of paths does not need to be recalculated based on the first and second subtrees.

7. The method of claim 6, wherein at least two of said spliced subtrees includes at least three nodes each.

8. The method of claim 1, wherein the particular tree of paths includes paths to at least two of the plurality of route computational nodes.

9. The method of claim 1, wherein each of the plurality of nodes is a sensor in radio-based communication with at least one of the plurality of nodes or the plurality of route computational nodes.

10. The method of claim 1, wherein each of the plurality of nodes is in communication with at least one of the plurality of nodes or the plurality of route computational nodes via radio-based communication.

11. The method of claim 1, wherein each of the plurality of route computational nodes is a gateway node to one or more other networks.

12. The method of claim 1, wherein said each route computational node of the plurality of route computational nodes said determines the tree of paths from itself through the network to each of a plurality of nodes based on a shortest path first computation on network connectivity information describing the network.

13. The method of claim 1, including: determining a tree of paths for each other node in addition to the particular node of the plurality of nodes to a plurality of the plurality of nodes based on at least two of said determined trees of paths for said route computational nodes; and populating one or more routing data structures stored in one or more computer-readable media in each of said other nodes with its respective said determined tree of paths.

14. The method of claim 13, wherein said determining the trees of paths for said other nodes is performed by one or more of the plurality of route computational nodes.

15. An apparatus, comprising:
one or more processors; and
memory;
wherein the memory stores one or more instructions that, when executed by said one or more processors, perform operations comprising:
determining a tree of paths specifying shortest path routing information from the apparatus to each of a plurality of nodes in a network;
determining a particular tree of paths on behalf of, and from the perspective of, a particular node of the plurality of nodes to a plurality of the plurality of nodes based on said determined tree of paths and one or more received trees of paths received from one or more other nodes of the plurality of nodes; wherein the particular tree of paths specifies shortest path routing information from the particular node to the plurality of the plurality of node; wherein said determining the particular tree of paths includes splicing subtrees from each of at least two trees of paths from a group including the particular tree of paths and said received trees of paths;
sending the particular tree of paths to the particular node for use in determining where to send packets in the network for the particular node to use in routing packets based on the particular tree of paths without calculating the particular tree of paths; and
populating, based on said determined tree of paths between the apparatus and each of the plurality of nodes in the network, one or more routing data structures stored in one or more computer-readable media for use in sending packets in the network;
wherein splicing of a first and second subtrees to form a tree of paths is defined as attaching the first and second subtrees using an identified node, common to both the first and second subtrees, such that said formed tree of paths does not need to be recalculated based on the first and second subtrees.

16. The apparatus of claim 15, wherein each of at least two said spliced subtrees includes at least three nodes.

17. The apparatus of claim 15, comprising a wireless communications interface configured for communication with one or more of the plurality of nodes.

18. An apparatus, comprising:
one or more processors; and
memory;
wherein the memory stores one or more instructions that, when executed by said one or more processors, perform operations comprising:
determining a tree of paths specifying shortest path routing information from the apparatus to each of a plurality of nodes in a network;
determining a particular tree of paths on behalf of, and from the perspective of, a particular node of the plurality of nodes to a plurality of the plurality of nodes based on said determined tree of paths; wherein the particular tree of paths specifies shortest path routing information from the particular node to the plurality of the plurality of node;
communicating the particular tree of paths to the particular node to populate, based thereon, one or more particular routing data structures for the particular node to use in routing packets based on the particular tree of paths without calculating the particular tree of paths; and
populating, based on said determined tree of paths between the apparatus and each of the plurality of nodes in the network, one or more routing data structures stored in one or more computer-readable media for use in sending packets in the network.

* * * * *